No. 776,179. PATENTED NOV. 29, 1904.
G. I. HERRICK.
PROTRACTOR TAPE.
APPLICATION FILED SEPT. 2, 1903.
NO MODEL.

Witnesses.

Inventor
George I. Herrick.
By Frank E. Herrick,
Attorney.

No. 776,179. Patented November 29, 1904.

UNITED STATES PATENT OFFICE.

GEORGE IRA HERRICK, OF WHEATON, ILLINOIS.

PROTRACTOR-TAPE.

SPECIFICATION forming part of Letters Patent No. 776,179, dated November 29, 1904.

Application filed September 2, 1903. Serial No. 171,640. (No model.)

*To all whom it may concern:*

Be it known that I, GEORGE IRA HERRICK, a citizen of the United States, residing at Wheaton, in the county of Dupage and State of Illinois, have invented new and useful Improvements in Protractor-Tapes, of which the following is a specification.

My invention relates to measuring-tapes, and especially to that class of tapes known as "protractor-tapes," which are adapted for use in laying off or measuring angles. This tape is for the purpose of aiding the surveyor in his work, doing away with the need of the ordinary instruments used in laying off or measuring angles. The other uses and purposes to which this tape may be put will be apparent from the following description.

The invention is illustrated in the accompanying drawings, in which—

Figure 1 is a top plan view of the tape, and Fig. 2 is a diagrammatical view to illustrate the use of the tape.

Fig. 2 shows the method of using the tape when the distance between the foci and the radius-vectors is one hundred units or the entire length of the tape.

Referring more particularly to the drawings, A and B in Fig. 1 are the ends of the tape, which may be of any ordinary structure and may have one end secured within a suitable holder for convenience in carrying.

The tape is divided into four divisions A D, D E, E F, and F B. Of these portions A D and F B for the purpose of this tape may be ungraduated; but the portions D E, E F are graduated to a scale of unequal parts, and certain of these graduations are numbered on the face of the tape with figures expressing degrees and running from "0°" at D and F to "180°" at E and represents $\theta$ of Fig. 2.

The graduations numbered in degrees are placed upon the tape for the purpose of designating the extremity of the radius-vectors of an ellipse the distance between whose foci is some percentage less than fifty of the entire length of the tape and whose major axis in the case shown in Fig. 2 is one hundred per cent. of the entire length of the tape less the percentage of the tape occupied by the distance between foci. These graduations constitute what may be called a "scale of radius-vectors" and are obtained by applying the polar equation of the ellipse with reference to an axis passing through a focus.

The radius-vector (shown in Fig. 2 as $r$) for a polar angle of zero degrees (shown as B' F' in Fig. 2) being equal to the distance from the focus to the vertex, a portion of the tape equal to this amount (shown by B F in Fig. 1) is left ungraduated, making the graduations commence at F. As the angle $\theta$ increases toward and up to one hundred and eighty degrees the radius-vector increases and is laid off from B toward and to E and numbered from "0°" at F toward and to "180°" at E.

In the device shown in the present drawings it is assumed that the tape measures one hundred feet, in which case B' F' is taken as twenty-five feet. The distance B' G is then thirty-three and one-third feet. This value of A' B' may vary in the tape shown in Fig. 2 from zero feet to fifty feet and constitutes, as before mentioned, the distance between the foci of the ellipse whose polar equation is used in computation. The valuation of the distance B' F' as proportioned to the length of the tape will in every case vary the eccentricity of the ellipse employed, the greater this distance A' B' the greater the eccentricity, as can be readily understood from the method of computation hereinbefore set out.

In using the tape the major axis of the ellipse, from which $\theta$ or the radius-vector corresponding to it is calculated, is made to coincide with the base-line from which $\theta$ is to be measured, and the point from which $\theta$ is to be measured or laid off is made the focus.

In using the tape the two ends B and A are secured at this point, (B' in Fig. 2.) Next toward the left fix the other focus, (which must of course be in the base-line and equal to the distance F E on the tape of the length of the tape.) Then hold point D of the tape at this focus and take the free portion of the tape and proceed from point B' in the direction of the line—for example, B' G—whose angle $\theta$ with the base-line is to be measured until the free portions are both taut, when they are in reality radius-vectors of an ellipse, and the graduation which is in the line B' G will be found upon inspection to be ninety degrees. Similarly any other angle, as $\theta'''$, $\theta''$, and $\theta''''$, measuring the azimuth of the points G''', G'', and G'''' may be measured.

When measuring angles from the right-hand focus, only the graduations from F to E are used; but when measuring angles from the left-hand focus, as the angle $\theta'$ to the point G', the ends A and B will be held at A' and point F of the tape will be held at B', when the angles may be read from the left-hand scale of radius-vectors from D to E. This scale D to E is only a convenience, being precisely like scale E F and reading from "0°" at D to "180°" at E. It may be dispensed with and angles from a left-hand focus may be read by placing A and B at A' and point D at B', when the angle $\theta'$ may be read on E F.

Variations may be introduced in specific details; but

What I desire to protect by Letters Patent and what I claim is—

1. A protractor-tape comprising ungraduated portions, and a portion having graduations so positioned with reference to the ends of the tape as to correspond to lengths of radius-vectors of an ellipse and designated by degree-numbers indicative of polar angles corresponding to the respective vector lengths, substantially as described.

2. In a device of the character described, a tape having ungraduated portions, and a portion lying between the same having graduations designated by degree-numbers representing polar angles from zero to one hundred and eighty degrees, and corresponding in their relation to the ends of the tape to lengths of radius-vectors of an ellipse for said angles.

3. A tape of the type set forth, having ungraduated portions and a portion having graduations in degree-numbers thereon indicating polar angles of an ellipse, corresponding to vector lengths, said vector lengths being measured at distances from the initial point of the tape corresponding to the lengths of the radius-vectors about the right-hand focus of the ellipse, said numbers reading from each end of the said portion to the center thereof, substantially as described.

4. In a device of the type set forth, a protractor-tape having a portion thereof graduated, the graduations being positioned with reference to the ends of the tape to correspond to lengths of radius-vectors of an ellipse and designated by degree-numbers representing polar angles corresponding to the vector lengths, substantially as described.

5. A device of the type set forth, comprising a portion graduated for angles from zero to a hundred and eighty degrees from each end to the center thereof, the graduations being in degree-numbers of polar angles of an ellipse and being so positioned with reference to the end of the tape as to correspond to the lengths of radius-vectors whose corresponding angles are represented by said numbers, substantially as described.

6. A protractor-tape comprising four divisions, two of said divisions being blank, and two others having graduations so disposed with relation to the ends of the tape as to correspond to various lengths of radius-vectors of an ellipse and designated by degree-numbers of polar angles corresponding to the vectors, said last-named divisions being equal and reading in angles from zero to one hundred and eighty degrees, substantially as set forth.

7. A protractor-tape having a graduated portion provided with a double graduation, the graduations being disposed with respect to the ends of the tape so as to correspond to lengths of radius-vectors of an ellipse and designating by degree-numbers polar angles corresponding to the respective vector lengths, said double graduation reading from the ends to the center of the graduated portion, substantially as set forth.

8. A protractor-tape having ungraduated portions and a portion having graduations thereon, the graduations being positioned with reference to the ends of the tape to correspond to lengths of radius-vectors of an ellipse and designated by degree-numbers representing polar angles corresponding to the vector lengths, the graduated portion being divided into two separate scales adapted to indicate these angles, substantially as set forth.

9. A tape having ungraduated portions and graduated portions, the graduations of said last-named portions being so positioned with reference to the ends of the tape as to correspond to lengths of radius-vectors of an ellipse, said graduations being designated by degree-numbers representing polar angles corresponding to respective vector lengths, substantially as described.

In testimony whereof I have signed my name to this specification in the presence of two subscribing witnesses.

GEORGE IRA HERRICK.

Witnesses:
R. P. HERRICK,
SAMUEL HERRICK.